Patented Sept. 15, 1931

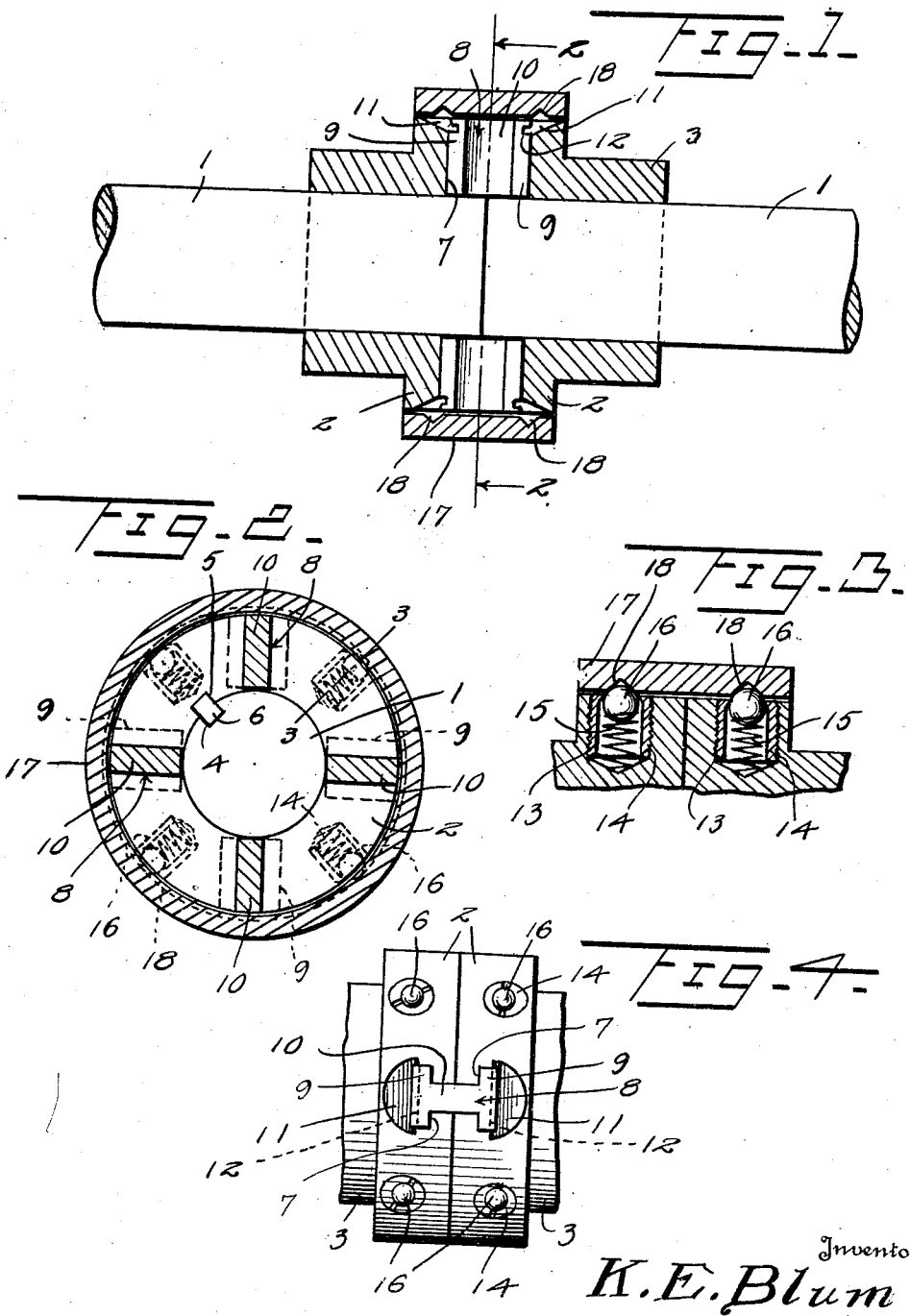

1,823,251

UNITED STATES PATENT OFFICE

KARL E. BLUM, OF FLAT RIVER, MISSOURI, ASSIGNOR OF ONE-HALF TO JOHN W. HOUSER, OF DESLOGE, MISSOURI

SHAFT COUPLING

Application filed May 25, 1929. Serial No. 365,932.

This invention relates to improvements in shaft couplings and has for its primary object to provide an improved coupling designed to afford a safe and convenient means for connecting the ends of two shafts which are substantially aligned.

Another object of the invention is to provide a coupling of the above described character which is free of bushings, pins or threaded elements normally employed in connection with shaft couplings and which complicate the coupling and uncoupling operation, particularly where threaded elements are used which elements frequently become jammed and difficult to remove.

Still another object of the invention is to provide a coupling between shafts which will present an exterior surface smooth throughout and free from the usual projecting bolt ends and nuts which elements are frequently the cause of considerable damages to machinists and engineers working in the vicinity of shafts, when the body or the hands come into contact therewith.

In addition to the foregoing, the present coupling has the advantages of being easily and quickly set up or taken apart as no tools are necessary for the performance of these operations, of possessing a resistance to tortional strain greater than the shafts which it connects and of being flexible.

The invention will be best understood from a consideration of the following detailed description taken in connection with the accompanying drawings forming a part of the present invention with the understanding, however, that the invention is not confined to any strict conformity with the showing of the drawing but may be changed or modified so long as such changes or modifications mark no material departure from the salient features of the invention as expressed in the appended claim.

In the drawings:—

Figure 1 is a view in longitudinal section of the coupling embodying the present invention showing the same applied to the abutting ends of a pair of shafts.

Figure 2 is a sectional view taken upon the line 2—2 of Figure 1.

Figure 3 is a sectional view taken upon the line 3—3 of Figure 2.

Figure 4 is a view in side elevation of the coupling with the key retaining ring removed.

Referring more particularly to the drawings, the numerals 1 indicate portions of a pair of shafts having their ends in abutting relation, as shown, and connected by the coupling embodying the present invention.

The present coupling structure comprises a pair of circular plates 2 each of which has projecting from one face thereof, a sleeve 3 which is designed to receive one of the abutting ends of the two shafts to be coupled together, the plate being centrally apertured to permit the ends of the shafts to extend therethrough and to come into abutting relation, as shown in Figure 1.

Each of the shafts is formed to provide a key-way 4 and the inner face of each sleeve and of the portion of the sleeve passage which extends through the plates is recessed to form a similar key-way 5 which receives a key 6 carried by the shaft, as shown in Figure 2.

From the foregoing description it will be understood that the faces of the plates 2 of the coupling are in abutting relation with the shaft ends, when the coupling is assembled.

Each of the coupling plates 2 has cut thereinto from the outer face to the center thereof a substantially T shaped slot 7, the reduced or stem portion of the slot opening through the face of the plate, as shown in Figure 2. These stem portions of the T shaped slots of the coupling plates 2 are brought into alignment and receive therebetween a key member 8 which is formed in the shape of the letter H, each of the side members 9 of the key positioning in the head portion of a T slot while the central connection portion 10 connects therebetween and holds the plates in face abutting relation, as shown in Figure 4.

The edge face of each plate is cut away across the head portion of each T slot therein as indicated at 11, to permit of the engagement by the nails of a forefinger and thumb of the key 8, the outer face of each portion 9 of the key being provided with a transverse slot 12 in which the nails may engage. By this means the key may be drawn out of the slots in which they are positioned for the release of the coupling members.

Each of the plates 2 has the edge face thereof provided with a series of threaded radially extending recesses 13, each recess lying between a pair of key slots 7, as shown in Figure 2. In each of these recesses 13 a bushing 14 is threaded. A spring 15 and a bearing ball 16 reside inside the bushing, one end of the spring resting against the bottom of the recess 13, the other end against the bearing ball 16 which is normally urged outward by the spring 15, the complete removal of the ball being prevented by turning inward the outer edge of the bushing in the usual manner.

When the coupling plates 2 are in the relation described and secured together by the keys 8 there is positioned about their edges, a key retaining ring 17 which, as shown in Figures 1 and 2, is of sufficient width to completely cover the edges of the plates. The inner face of this ring is provided with a pair of circumferential grooves 18 in each of which the spring pressed balls 16 of an adjacent plate engage.

From the foregoing description it will be readily seen that the coupling herein provided may be easily and quickly assembled to secure a pair of shafts together in end abutting relation and when in assembled condition no rough surfaces or projecting parts remain which would endanger anyone coming into contact with the coupling while the shafts which it connects are rotating. It is, of course, apparent that these couplings may be made in innumerable sizes and that the size and number of the keys may be accordingly increased or decreased as necessary.

The present coupling is particularly adapted for use where end thrust or tension occurs for it will permit these conditions of service and will at the same time be more flexible than other couplings where connecting bolts or similar elements are employed. The coupling is particularly adapted for connecting motors to pumps, connecting line shafting, in motor-generating sets, farm lighting units, washing machines, and practically all machines having direct connected motor drives.

Having thus described my invention, what I claim is:—

A shaft coupling comprising a pair of plates each designed to be secured upon a shaft end and to be brought into face abutting relation, each of said plates having a series of substantially T shaped key slots cut thereinto from the peripheral face thereof, the stem portions of the slots opening through the abutting faces of the plates, and key members of substantially H shaped design each having each side positioned in a T shaped slot to secure the plates together, each of said plates having the peripheral surface thereof recessed at the inner end of each slot to facilitate the engagement of one side of a key therein for removal of the same and key retaining means spacedly positioned about the peripheries of said plates.

In testimony whereof I hereunto affix my signature.

KARL E. BLUM.